No. 849,696. PATENTED APR. 9, 1907.
L. J. OLDEN.
FLORAL DESIGN.
APPLICATION FILED NOV. 16, 1906.
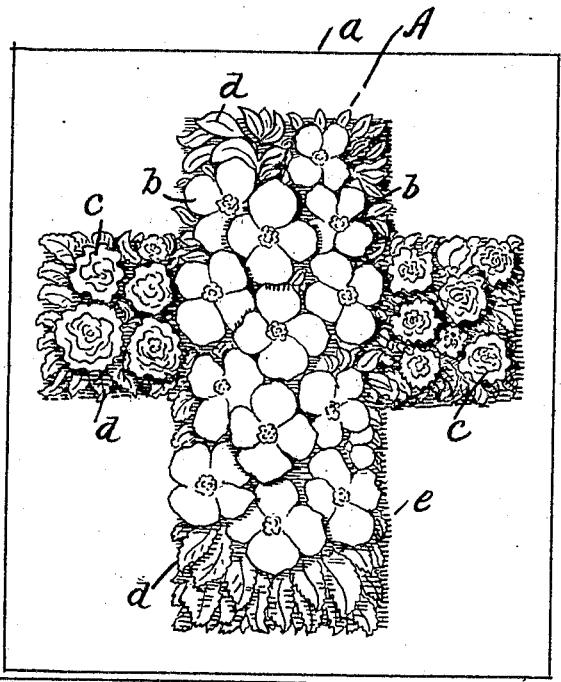
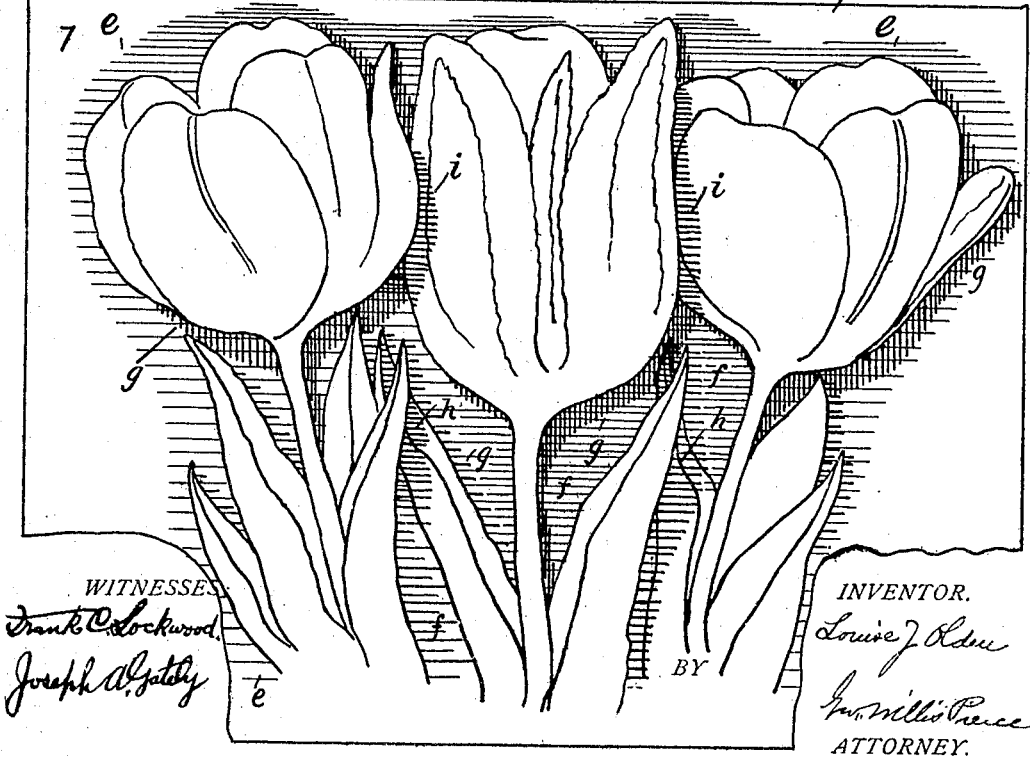

UNITED STATES PATENT OFFICE.

LOUISE J. OLDEN, OF BOSTON, MASSACHUSETTS.

FLORAL DESIGN.

No. 849,696. Specification of Letters Patent. Patented April 9, 1907.

Application filed November 16, 1906. Serial No. 343,683.

*To all whom it may concern:*

Be it known that I, LOUISE J. OLDEN, residing at Boston, in the county of Suffolk and State of Massachusetts, have invented certain Improvements in Floral Designs, of which the following is a specification.

The present invention relates to a method or process of making floral designs for the use of persons, such as florists and others, who sell by sample and for convenience make use of sheets of printed or colored plates to represent or illustrate the appearance of and how to arrange real flowers and foliage in wreaths, bouquets, and set pieces, which sheets are arranged in books or portfolios and represent in natural shapes and colors the leaves and flowers composing the same. All such plates or designs that I am aware of are drawn and painted by hand and are reproduced in similar shapes and colors by lithography, which is a very expensive process, as the original painting requires time and fine artistic skill.

My invention aims to produce similar effects as the present process and at a greatly-reduced cost in the production of the original design, and consists in sketching the proposed design upon cardboard upon a painted background and then arranging and pasting thereon in an artistic manner lithographed leaves and flowers cut from sheets and when the paste is dry in going over the whole design with brush and paint, shading near the pieces, so that they will appear to stand out from the cardboard in a natural manner, and in painting shadows upon the leaves and flowers and also the cardboard not covered by the pasted-on parts, all in a manner to produce the effect of an expensive hand-painted design, and when the design has been thus finished I cover it over with some transparent varnish having considerable body, which not only gives the design a luster to bring out the colors and produce a pleasing effect, but serves as a binder over all the pasted-on pieces composing the design, filling the interstices between them and holding them to the cardboard as in a matrix. Such sheets of colored lithographed foliage and flowers as I cut from are made in Germany for decorating fancy boxes and for a variety of purposes and are sold very cheaply.

The invention also relates to a method or process for producing lithographs in colors from the built-up plates of designs produced by the process hereinbefore referred to, which are bound in books.

I will now proceed to describe in detail the processes by which I produce the designs and lithographs, reference being had to the accompanying drawings, in which—

Figure 1 is a representation of a floral cross. Figs. 2, 3, and 4 are views of detached flowers or pieces. Fig. 5 is a representation of tulips to indicate the method of shading and arrangement to bring the several parts into an appearance of wholeness or homogeneity.

In the drawings, $a$ represents a cardboard, and A a floral cross in colors thereon, in which the separate flowers $b$ $c$ and the leaves or foliage $d$ are individual pieces pasted upon the cardboard. These pieces are cut from artistic lithographic cards and may be a series of flowers of the same kind, such as are made for trade purposes or from any design. These cards are lithographed in great numbers, and they are produced very cheaply. I cut the pieces out from the sheets and having first sketched a design upon the cardboard paste them in selected places thereon. Before pasting the pieces onto the cardboard I paint the space which the design is to occupy the proper shades to form a background $e$, and when the pieces are pasted on I paint near the edges of the flowers the representation of shadows $g$ in order to cause the flower or leaf to stand out and present a natural appearance, and where flowers or leaves extend or lap over each other I also paint shadows $h$ and $i$ upon the same for the purpose of causing the piece in advance to indicate the fact, and in many places where the cardboard is not covered by the pieces, as $f$, I paint them darker than the common background to indicate shadows. The design when thus built up and painted is intended to represent a satisfactory floral design in natural form and colors for the purpose described, and as the several lithographed pieces are made and finished in an artistic manner the background and shading can be added at a comparatively small cost. When the design is thus formed, I cover the same with a coat of some transparent varnish of a suitable body, which adds to the general effect and also serves as a binder and incloses and holds all the parts securely to the cardboard and is an auxiliary to the paste.

When the design is completed as described, it forms the basis for color lithography the same as a design painted entirely by hand and owing to the reduced cost of its production brings the price of the lithograph to a comparatively low figure.

It will be understood that other designs than floral ones may be formed by this process.

I claim as my invention—

1. A process of forming designs which consists in aggregating the several essential features thereof as overlapped individual pieces attaching them to a cardboard having a suitable painted background, and touching up the interstices and in producing shadows, and covering the same with a coat of varnish.

2. A process of forming designs which consists in aggregating the several features thereof as overlapped individual pieces attaching them to a cardboard having a suitable painted background, and touching up the interstices and in producing shadows covering the same with varnish and reproducing the same.

3. A process of forming designs in colors which consists in aggregating the several essential features thereof as overlapped individual pieces attaching them to a cardboard having a suitable painted background, and touching up the interstices and in producing shadows, and covering the same with a coat of varnish.

In testimony whereof I have signed my name to this specification, in the presence of two subscribing witnesses, this 13th day of November, 1906.

LOUISE J. OLDEN.

Witnesses:
ARCHIBALD McCULLAGH,
JOHN B. OLDEN.